(12) United States Patent
Lo

(10) Patent No.: US 6,185,649 B1
(45) Date of Patent: Feb. 6, 2001

(54) SYSTEM FOR CORRECTING AN ILLEGAL ADDRESSING SIGNAL BY CHANGING A CURRENT BIT FROM ONE TO ZERO IF A BIT IMMEDIATELY LEFT ADJACENT TO THE CURRENT BIT IS ZERO

(75) Inventor: John M. Lo, Fremont, CA (US)

(73) Assignee: Toshiba America Electronic Components, Inc., Irvine, CA (US)

( * ) Notice: Under 35 U.S.C. 154(b), the term of this patent shall be extended for 0 days.

(21) Appl. No.: 09/081,693

(22) Filed: May 19, 1998

(51) Int. Cl.$^7$ ...................................................... G06F 13/14
(52) U.S. Cl. ................... 710/129; 714/40; 341/94
(58) Field of Search ........................ 710/1, 129; 714/30; 341/94

(56) References Cited

U.S. PATENT DOCUMENTS

| | | | |
|---|---|---|---|
| 4,658,399 | * 4/1987 | D'Angio et al. | 714/704 |
| 4,677,627 | * 6/1987 | Hong | 714/811 |
| 5,023,612 | * 6/1991 | Liu | 341/94 |
| 5,235,603 | * 8/1993 | McNesby et al. | 714/815 |
| 5,287,321 | 2/1994 | Shiffer, II | 365/230.01 |
| 5,377,264 | 12/1994 | Lee et al. | 380/4 |
| 5,510,786 | * 4/1996 | Gorshe | 341/73 |
| 5,555,250 | 9/1996 | Walker et al. | 371/40.1 |
| 5,611,065 | * 3/1997 | Alferness et al. | 711/220 |
| 5,649,129 | 7/1997 | Kowert | 395/309 |
| 5,649,162 | 7/1997 | Klein et al. | 395/500 |

* cited by examiner

Primary Examiner—Thomas C. Lee
Assistant Examiner—Abdelmoniem Elamin
(74) Attorney, Agent, or Firm—Andrew V. Smith

(57) ABSTRACT

An apparatus and a method detect and automatically correct an illegal address in a peripheral connect interface bus addressing scheme. The value of a current bit is read. The value of a bit immediately left adjacent of the current bit is read. A value of 0 is outputted as the current bit in the event the value of the current bit is 1 and the value of the left adjacent bit is 0. In one specific embodiment, the apparatus employs a multiplexer and a single-bit register with a feedback as a one bit detection and correction circuit.

6 Claims, 1 Drawing Sheet

| Address Signal Loaded | Available Memory |
|---|---|
| 0 _ _ _ _ _ _ _ _ 0 | 4 Gb |
| 1 _ _ _ _ _ _ _ _ 0 | 2 Gb |
| 1 1 _ _ _ _ _ _ _ 0 | 1 Gb |
| 1 1 1 _ _ _ _ _ _ 0 | 512 Mb |
| 1 1 1 1 _ _ _ _ _ 0 | 256 Mb |
FIG. 1
(PRIOR ART)
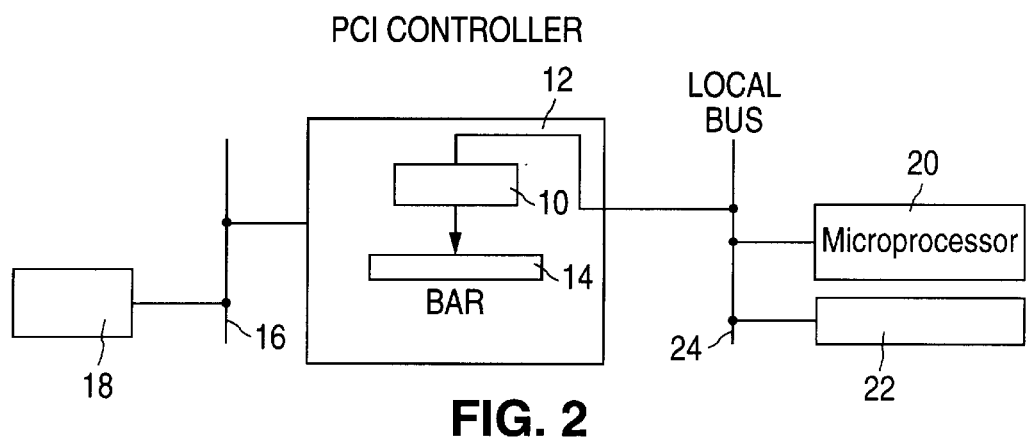
FIG. 2
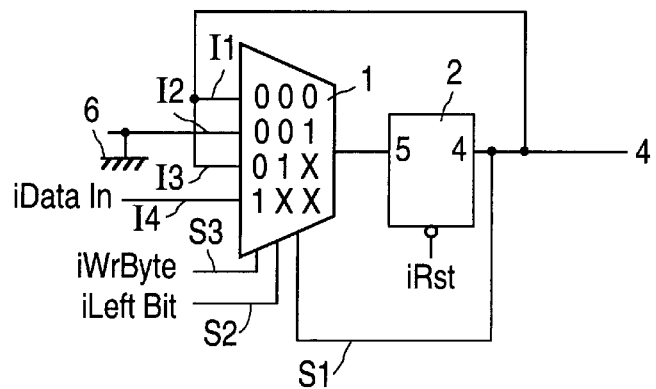
FIG. 3

SYSTEM FOR CORRECTING AN ILLEGAL ADDRESSING SIGNAL BY CHANGING A CURRENT BIT FROM ONE TO ZERO IF A BIT IMMEDIATELY LEFT ADJACENT TO THE CURRENT BIT IS ZERO

BACKGROUND OF THE INVENTION

1. Field of the Invention

The present invention relates to a peripheral connect interface (PCI) addressing scheme, and more particularly, to an auto detection and correction logic for a PCI bus addressing scheme.

2. Description of Related Art

A PCI bus interfaces a master to a number of slave peripheral devices through the PCI bus. Each of the peripheral devices has an associated base address register, typically 32 bits in length. The PCI convention specifies that if the peripheral device has a certain amount of memory that is addressable, the master loads an address signal, of is a particular format, into the base address register.

FIG. 1 is a table of specified base address signals according to the amount of memory available under PCI convention. For example, if all 4 gigabytes (32 bits) of memory are available, the base address register is loaded with all 32 bits each with a value of "0" or "0 . . . 0." If there are two gigabytes of memory available, the first or left most bit is denoted "1" followed by all 31 bits of "0"s. Thus, if two gigabytes of memory are available, the base address register is loaded with "1 0 0 . . . 0." If only one gigabyte of memory is available, then the two left most bits are denoted "1" and followed by all "0"s, thereby loading the base address register with "1 1 0 0 . . . 0."

Sometimes the base address register may be loaded with an illegal address. One type of illegal address is an out of range address or an address of the wrong size. For example, an address 16 bits in length is an illegal address. Prior art to correct and illegal address have included U.S. Pat. Nos. 5,555,250; 5,649,162; 5,649,129; 5,337,264; and 5,287,321.

Another type of illegal address is an address of the correct size, but illegal in that the address violates PCI convention. For example, an address such as "1 1 0 1 0 0 . . . 0" is an illegal address because a "1" is to the right of a "0". According to PCI convention, a "0" may not be the left adjacent bit of a "1".

There are a number of methods for detecting an illegal address. For example, an out of range address may be detected with a detection scheme that uses combinatorial logic. However, currently there is no apparatus or method for detecting an illegal addresses, that violates the PCI convention, as described, above, and corrects it.

SUMMARY OF THE INVENTION

The present invention is a method and apparatus that automatically corrects any illegal address that is to be loaded to a base address register. In accordance with the present invention, a current bit is read. If the current bit is "0," the address is legal regardless of the value of the left adjacent bit. However, if the current bit is "1," the addressing scheme reads the left adjacent bit to determine if the address is legal. If the left adjacent bit is "1," the address is legal. However, if the left adjacent bit is "0," the address is illegal and the current bit is corrected to "0."

BRIEF DESCRIPTION OF THE DRAWINGS

The invention will be better understood by reference to the attached figures in which:

FIG. 1 is a table of address signals for a base address register of 32 bits, according to PCI convention.

FIG. 2 is a block diagram of a system showing the interface between a master, a PCI controller, and the PCI bus.

FIG. 3 is a schematic diagram of a circuit using a multiplexer with a single-bit register.

DETAILED DESCRIPTION OF THE INVENTION

Referring to FIG. 2, there is shown a 32-bit base address register 14 in a PCI controller 12. A PCI bus 16 interfaces the PCI controller 12 to a master 18. A local bus 24 interfaces the PCI controller 12 to a microprocessor 20 and memory 22. The PCI base address register 14 can be loaded with an address signal by the microprocessor 20. The address signal stored in the register 14 is then used by the master 18. The PCI controller 12 also includes a circuit 10 of the present invention. The circuit 10 receives the address signals from the local bus 24 and corrects an illegal address prior to storing it in the base address register 14.

In the method of the present invention, the circuit 10 reads a value of a current bit, e.g. bit 0, the right-most bit. The circuit 10 also reads a value of a bit immediately to the left and adjacent to the current bit. Thus, for example, if the current bit is bit 0, the circuit 10 would then read the value of bit 1. Finally, the circuit 10 would change the value of the current bit, e.g. bit 0, to the value of 0, if the value of bit 0 from the local bus 24 is 1, and the value of the left adjacent bit is 0. Otherwise, the circuit 10 would load the value of the current bit received from the local bus 24 into the base register 14, without changing it.

While the method has been described with regard to the reading of a current bit and its left adjacent bit, the method of the present invention can also be practiced in a two-step process. The current bit can be read and if the value is 0, then that value is stored in the base register 14. If the value is 1, then the circuit 10 reads the value of the left adjacent bit. If the value of the left adjacent bit is 1, then the current bit is stored in the base register 14. If the value of the left adjacent bit is 0, then the value of the current bit is changed to 0 and is then stored in the base register 14.

One apparatus 10 to accomplish the foregoing is shown in FIG. 3. FIG. 3 is a schematic block diagram of a hardware representation of the present invention to detect and to correct one bit. The circuit shown in FIG. 3 was generated using software written in the verilog language, a standard IEEE language for design of hardware. A copy of the software program used to generate the hardware description of the present invention is as follows:

```
/****************************************
* Auto Correction BAR size register bit - AutoECC (R/W)
****************************************/
module AutoECC(iReset, iClk,
   iResetValue, iLeftBit, iWrByte, iDataIn, oQ);
input iReset, iClk, iResetValue, iWrbyte, iLeftBit, iDataIn;
output       oQ;
reg          oQ;
// R/W bit
always @ (posedge iClk)
  if (iReset)
     oQ <= iResetValue; // Power on default value
  else
     casex({iWrByte, iLeftBit, oQ})
```

```
3'b000: oQ<=oQ;          // Keep the value
3'b001: oQ<=1'b0;        // correct to '1'
3'b01x: oQ<=oQ;          // ok
3'b1xx: oQ<=iDataIn;     // load new value
    endcase
endmodule
```

A conventional Hardware description language compiles the foregoing program to generate the schematic diagram shown in FIG. 3.

In FIG. 3, the circuit 10 comprises a multiplexer 1 which determines whether the current bit needs to be corrected and corrects it if it is an illegal value. The multiplexer 1 has four inputs (I1, I2, I3 & I4). I1 is the current bit and is the output of the circuit 10. I2 is held at ground. Thus if I2 is selected a "0" is inputted into the multiplexer 1. I3 is also the current bit and is also the output of the circuit 10. I4 is the initial value loaded into the multiplexer 1 by the microprocessor 20. The output of the multiplexer 1 is stored in a register 2.

The four inputs of the multiplexer 1 are selected by the selection lines S1 and S2. The two lines S1 and S2 can select four possible inputs to the multiplexer 1. The selection line S3 is the load signal. When S3 is active, it causes the value on I4 to be loaded through the multiplexer 1 and into the input 5 of the register 2 to be stored in the register 2. On the next clock cycle, the output of the register 2 is then routed back as I1 and I3 inputs to the multiplexer 1. In addition, the output of the register 2 is used as the control signal S1. The control signal S2 is the output of the register 2 from an adjacent left bit.

In the operation of the circuit 10, the multiplexer 1 simply outputs the current bit if the multiplexer 1 selects as the output either input line I1 or input line I3. If input line I1 or input line I3 is selected as the output, the current bit is output from the multiplexer 1 and then entered as the input 5 to the single-bit register 2. I1 and I3 are selected when the bit patterns are "1X" or "00" which are legal values and therefore are stored back to itself. If S2 is "0" and S1 is "1", then this represents an illegal value of "01". In that event, the combination of S1 and S2 selects input line I2, which causes a value of "0", to be loaded through the multiplexer 2, and stored in the register 2. All other combinations of S1 and S2 causes either I1 or I3 to be loaded back into the register 2, i.e. no change is made to the value of the register 2.

The multiplexer 1 selects input line I1 if the current bit, S1, is "0" and the left bit, S2, is also "0," which is input via selection line S2. A "0 0" combination is legal according to PCI convention. Consequently, the multiplexer 1 outputs "0" to the single-bit register 2 because it selects input line I1, which is the current bit, "0."

Input line I3 is selected if the left bit, S2, is "1," regardless of the value of the current bit, S1. As long as the left bit from selection line S2 is "1," the current bit does not need to be corrected according to PCI convention. The multiplexer 1 outputs the value of the current bit to the single-bit register 2 because it selects input line I3, which is the value of the current bit.

If the value of the current bit from selection line S1 is "1" and the value of the left bit from selection line S2 is "0," then such a "0 1" combination is illegal according to PCI convention. The multiplexer 1 will automatically correct the current bit to a "0" by selecting input line I2 to output to the single-bit register 2. Input line I2 is connected to ground 6, which has a value of "0." Thus, the output to the single-bit register is "0," correcting the current bit to "0."

As previously discussed, the circuit shown in FIG. 3 detects and corrects one bit. For a circuit to detect and to correct 32 bits, 32 circuits of the type shown in FIG. 3 would be required. Furthermore, there are several manners to operate such a 32 bit circuit. Let us assume that the bit pattern received by the circuit is:

1 1 . . . 1 1 0 1 1 0 1 1 0 0
31 30 . . . 9 8 7 6 5 4 3 2 1 0 where the numbers under the bit pattern of "11 . . . 1101101100" indicate bit position. Based upon the foregoing discussion, it can be seen that bits located at positions 6, 5, 3, and 2 are in error and should all be corrected to "0". There are two ways to correct this.

First, if each of the bit detection and correction circuit shown in FIG. 3 operates synchronously, i.e. detect and correct in response to a clock signal, then the correction of the above bit pattern would require two clock cycles. In the first clock cycle, the circuits would analyze from left-to-right (or from higher order bit position to lower order bit position), and detect and correct bits located at positions 6 and 3. The resultant bit pattern would be:

1 1 . . . 1 1 0 0 1 0 0 1 0 0
31 30 . . . 9 8 7 6 5 4 3 2 1 0

The second clock cycle would detect and correct bits located at positions 5 and 2, again, proceeding from left to right (or from higher order bit position to lower order bit position).

Alternatively, using combinatorial logic, and with appropriate delay, the bit pattern can be detected and corrected asynchronously.

What is claimed is:

1. An apparatus to correct an illegal addressing signal comprising:

means for reading a value of a current bit;

means for reading a value of a left adjacent bit of said current bit; and means for outputting a value of 0 as said current bit in the event said value of said current bit is 1 and said value of said left adjacent bit is 0.

2. The apparatus of claim 1 further comprising:

means for outputting said value of said current bit as said current bit for all other values of said current bit and said left adjacent bit.

3. An apparatus to correct an illegal addressing signal comprising:

a multiplexer;

a single-bit register;

a first selection line connecting an output of said single-bit register with the multiplexer;

a first input line connecting the single-bit register with the multiplexer;

a third input line connecting the single-bit register with the multiplexer;

a second input line connected to ground having a level of 0;

a fourth input line for supplying input data to said multiplexer;

a second selection line connecting an output of an adjacent single bit register with the multiplexer; and an output line connecting the multiplexer with the single-bit register.

4. The apparatus claim 3 wherein:

the first selection line for supplying a first value of a current bit from the single-bit register to the multiplexer;

the first input line for supplying the first value of the current bit from the single-bit register to the multiplexer;

the third input line for supplying the first value of the current bit from the single-bit register to the multiplexer;

the second selection line for supplying a value of a left adjacent single bit register to the multiplexer wherein the left adjacent bit is a left adjacent bit of the current bit; and the output line for supplying a second value of the current bit from the multiplexer to the single-bit register.

5. A method for correcting an illegal addressing signal comprising the steps of:

inputing a current bit from a single-bit register to a multiplexer via a first selection line;

inputing the current bit from the single-bit register to the multiplexer via a first input line and a third input line;

inputing a left bit to the multiplexer via a second selection line, the left bit being a left adjacent bit of the current bit;

inputing a value of 0 to the multiplexer via a second input line;

selecting an input from the input lines for an output based on the inputs from the first and second selection lines; and sending the output to the single-bit register.

6. The method of claim 5, wherein the selecting step comprises the steps of:

selecting a value from the second input line if the current bit is 1 and the left bit is 0.

* * * * *